United States Patent
Kollen et al.

(10) Patent No.: US 10,199,913 B2
(45) Date of Patent: Feb. 5, 2019

(54) PRIMARY PART FOR A LINEAR MOTOR, A LINEAR MOTOR COMPRISING THE SAME, AND METHOD FOR MANUFACTURING SUCH PRIMARY PART

(71) Applicants: Tecnotion B.V., Almelo (NL); Tecnotion Holding B.V., Almelo (NL)

(72) Inventors: Jan Hendrik Kollen, Almelo (NL); Wouter Jan Van Beek, Almelo (NL)

(73) Assignees: Tecnotion B.V. (NL); Tecnotion Holding B.V. (NL)

( * ) Notice: Subject to any disclaimer, the term of this patent is extended or adjusted under 35 U.S.C. 154(b) by 863 days.

(21) Appl. No.: 14/674,644

(22) Filed: Mar. 31, 2015

(65) Prior Publication Data

US 2015/0280539 A1 Oct. 1, 2015

(30) Foreign Application Priority Data

Mar. 31, 2014 (NL) ...................................... 2012535

(51) Int. Cl.
*H02K 9/00* (2006.01)
*H02K 41/03* (2006.01)
(Continued)

(52) U.S. Cl.
CPC ............ *H02K 41/03* (2013.01); *B22D 19/04* (2013.01); *B22D 19/16* (2013.01); *B22D 25/02* (2013.01);
(Continued)

(58) Field of Classification Search
CPC ............ H02K 41/03; H02K 9/19; H02K 3/24; H02K 9/00; H02K 5/20; H02K 1/20; H02K 5/08
See application file for complete search history.

(56) References Cited

U.S. PATENT DOCUMENTS 6,140,734 A * 10/2000 Hazelton .................. H02K 3/04
310/12.21
6,278,203 B1 * 8/2001 Novak ................ G03F 7/70758
310/12.06

(Continued)

FOREIGN PATENT DOCUMENTS

DE 102006023493 A1 11/2007
JP H05184093 A 7/1993

OTHER PUBLICATIONS

Search Report and Written Opinion completed on Oct. 17, 2014; ISA/EP.

*Primary Examiner* — Joshua Benitez Rosario
*Assistant Examiner* — Leda Pham
(74) *Attorney, Agent, or Firm* — Banner & Witcoff, Ltd.

(57) ABSTRACT

A primary part for a linear motor, a linear motor comprising such primary part, and a method for manufacturing such primary part. The primary part comprises a housing, a pre-casted unit having at least two coils which are mutually fixed in position by a solidified first casting material, a plurality of spacer elements disposed between the pre-casted unit and the housing, the plurality of spacer elements contacting the housing and ensuring a space between the housing and the pre-casted unit, and a solidified second casting material filling the space between the housing and the pre-casted unit. The solidified second casting material ensures a fixed connection of the housing to the pre-casted unit.

16 Claims, 8 Drawing Sheets

(51) Int. Cl.
    *B22D 19/04*    (2006.01)
    *B22D 19/16*    (2006.01)
    *B22D 25/02*    (2006.01)
    *B23K 31/02*    (2006.01)
    *H02K 15/02*    (2006.01)
    *H02K 3/47*     (2006.01)
    *H02K 15/12*    (2006.01)

(52) U.S. Cl.
    CPC ............. *B23K 31/02* (2013.01); *H02K 15/02* (2013.01); *H02K 41/031* (2013.01); *H02K 3/47* (2013.01); *H02K 15/12* (2013.01)

(56)            References Cited

U.S. PATENT DOCUMENTS

| | | | |
|---|---|---|---|
| 6,622,369 B1 | 9/2003 | Hwang et al. | |
| 2003/0111916 A1* | 6/2003 | Baccini | H02K 41/031 310/12.33 |
| 2006/0091732 A1 | 5/2006 | Onishi | |
| 2007/0252444 A1* | 11/2007 | Sadakane | H02K 41/031 310/12.21 |

\* cited by examiner

PRIMARY PART FOR A LINEAR MOTOR, A LINEAR MOTOR COMPRISING THE SAME, AND METHOD FOR MANUFACTURING SUCH PRIMARY PART

This application claims priority to Dutch Patent Application No. 2012535 filed on Mar. 31, 2014. The present application claims priority to and the benefit of the above-identified application and the above-identified application is incorporated by reference herein in their entirety.

The present invention relates to a primary part for a linear motor. It further relates to a linear motor comprising such primary part. Finally, the invention also relates to a method for manufacturing such primary part.

Linear motors are known in the art. An example thereof is illustrated in FIG. 1. These motors comprise a primary part 1, sometimes referred to as the forcer, which primary part 1 comprises one or more electrical coils 2. A linear motor further comprises a secondary part 3, which normally comprises a plurality of permanent magnets 4.

By allowing a current to flow through the electrical coils, the primary part and secondary part will move with respect to each other. The amount of acceleration that can be achieved for this relative motion depends inter alia on the strength of the magnetic field exerted on the current carrying coils, the mass of the moving part, and the current through the coils.

Typically, a primary part comprises a frame, for instance made from Aluminum, which is open on one or more ends. A coil assembly, comprising at least two magnets, is arranged in the frame. Subsequently, the frame is closed using one or more metal plates to form a housing. The housing comprises an inlet to allow a casting material to be injected. After this casting material has been solidified, the coils are fixed inside the housing and the housing, casting material, and coils form one solid part.

In iron core linear motors, the primary part comprises an iron core around which the coils are wound. In these motors, magnets are arranged side by side and have an alternating polarity orientation. As such, the magnetic field extends between adjacent magnets through the iron core. On one hand, the secondary part and primary part must be as close together as possible to increase the magnetic field near the coils whereas on the other hand, a small separation must be observed to ensure a smooth relative motion.

The same holds for ironless linear motors in which the primary part is arranged in a U-shaped slot in the secondary part. Here, the permanent magnets are arranged on opposite sides of the slot. Moreover, along the length of the slot, magnets are adjacently arranged, again using an alternating polarity orientation. In this type of motor, the magnetic field strongly decreases with increasing gap between opposing magnets. To reduce this gap, relatively thin primary parts must be used to ensure a high magnetic field. On the other hand, using thinner coils to achieve this goal reduces the resulting force caused by the magnetic field. To achieve a given acceleration, a trade off must therefore be found.

Another important aspect to achieve a given acceleration, is the mass of the primary part, assuming that it is the primary part that is moving. This mass is partly determined by the materials used for the housing, which is typically a metal. It should be noted that the acceleration normally depends on the position of the primary part with respect to the secondary part. This effect is undesirable as it lowers the predictability of the movement and position of the moving part. Moreover, shock effects due to variable acceleration impart stress to both the moving part and the load that it connected to the moving part.

It is an object of the present invention to realize linear motors having a higher acceleration and/or a more constant acceleration. According to a first aspect of the invention, at least one of these goals is achieved with the primary part as defined by claim 1.

According to the invention, the primary part comprises a housing, a pre-casted unit comprising at least two coils which are mutually fixed in position by a solidified first casting material, and a plurality of spacer elements disposed between the pre-casted unit and the housing. The plurality of spacer elements contact the housing and ensure a space between the housing and the pre-casted unit. The primary part further comprises a solidified second casting material filling the space between the housing and the pre-casted unit, wherein the solidified second casting material ensures a fixed connection of the housing to the pre-casted unit.

The primary part according to the invention uses two casting materials, which may be identical, which are casted in two distinct steps. In a first step, the at least two coils are mutually fixed in position using a first casting material. At this stage, the coils are not arranged inside the housing. This has the advantage that the coils are more accessible allowing the mutual position to be controlled more reliably during the casting process. By having a better mutual positioning, a lower acceleration variation can be achieved.

However, the casting of the coils, resulting in the formation of the pre-casted unit, allows for a further advantage to be achieved. More in particular, the pre-casted unit can be used as a support during the next step in which a housing is provided into which the pre-casted unit will finally be arranged. Typically, the walls of the housing must have a certain thickness to offer sufficient rigidity during the step of arranging the pre-casted unit in the housing. According to the invention, the pre-casted unit supports the housing, using spacer elements, such that thinner walls may be used. By supporting the housing using the pre-casted unit and the spacer elements, sufficient rigidity can be obtained for subsequent processing even using very thin walls of the housing. The use of thinner walls can reduce the overall thickness of the primary part, thereby increasing the acceleration that can be achieved.

To fully attach the housing to the pre-casted unit, a second casting material is used during a second casting step. This material is injected into the space between the pre-casted unit and the housing and serves as an adhesive between the pre-casted unit and the housing. It also serves to increase the rigidity of the final assembly, and to eliminate pockets of air which are potentially destructive if the motor is used in a reduced pressure atmosphere, such as a vacuum.

The plurality of spacer elements may contact each side of the housing to ensure a space between each side of the housing and the pre-casted unit. This ensures that enough second casting material can be injected in between the pre-casted unit and the housing such that each side of the housing becomes fixedly attached to the pre-casted unit.

The plurality of spacer elements may be coupled and/or connected to the pre-casted unit. For instance, the spacer elements can be included in the mould during the first casting step. This will allow the spacer elements to become fixedly attached to the pre-casted unit. Alternatively, the spacer elements can be inserted into the housing prior to the second casting step. However, it is then important to at least couple the spacer elements to the pre-casted unit such that the spacer elements provide a well defined distance between the pre-casted unit and the housing. As an example, the spacer elements could be in the form of a wire that is tightly wound around the pre-casted unit prior to the second casting step.

It is advantageous if the plurality of spacer elements are integrally connected to the solidified second casting material. More in particular, the plurality of spacer elements may consist of the first casting material, wherein the plurality of spacer elements have been formed during the casting of the pre-casted unit. This allows the spacer elements to be formed and positioned with great accuracy.

The plurality of spacer elements may comprise protruding elements which preferably protrude outwardly from a surface, an edge and/or a corner of the pre-casted unit, wherein a length of the protruding element is preferably within a range between 0.1 mm and 0.5 mm. The minimum protrusion length is dictated inter alia by the second casting material. The space between the pre-casted unit and the housing should be large enough such that the second casting material may enter that space during the casting process.

To ensure that each side of the pre-casted unit is properly spaced apart from a corresponding side of the housing, it is advantageous if each side of the pre-casted unit is connected to and/or coupled with at least three spacer elements. In an embodiment, each corner of the pre-casted unit is provided with a protruding element. This element could be in form of a ball or needle like element. These elements may function as spacer element for different sides of the pre-casted unit at the same time. They could for instance extend between a corner of the pre-casted unit to a corresponding corner of the housing. Here, it is noted that typically the pre-casted unit and the housing both have a bar shape. In case the thickness of the walls of the housing is insufficient to provide sufficient rigidity when three spacer elements are used, more spacer elements may be used. For instance, if foil material is used, the housing will typically not be rigid enough to have its position fully determined by only three contact points, and so more spacer elements may be required.

The at least two coils may be arranged to carry current in a plane, wherein the housing comprises a sheet part arranged parallel to said plane. It is the distance perpendicular to this plane that strongly determines the magnetic field exerted on the coils during operation. Using relatively thin sheet parts perpendicular to this direction allows a thinner primary part to be obtained, resulting in higher magnetic fields and therefore higher acceleration. Because the pre-casted unit contacts and thereby supports this sheet part, very thin sheets may be used. Similarly, the housing may comprise a plurality of sheet parts that are connected to each other, for instance by welding. Such housing may be partially assembled prior to the first casting step. Alternatively, the housing is assembled after the first casting step but before the second casting step. In this case, the pre-casted unit can be used as a support when the sheets are placed against pre-casted unit. The housing can be built up starting with individual sheets which are first placed against and/or attached to the pre-casted unit and which are subsequently connected to each other, for instance by welding.

As a further example, the housing may comprise a box element and a lid element, which are assembled prior to the second casting step. The pre-casted unit is inserted into the box element after which the lid is fixedly connected to the box element, for instance by welding. Subsequently, the second casting material is injected to ensure proper connection between the housing and the pre-casted unit. Also in this case, relatively thin parts may be used for the construction of the housing as the spacer elements provide support during and after the insertion of the pre-casted unit into the box element.

The housing can at least partially be made from metal. More in particular, at least the abovementioned sheet part, lid element and/or box element of the housing can be made from stainless steel.

The use of metals allows the motors to be used in high vacuum applications. In these applications it is necessary to prevent outgassing of elements into the vacuum. As the casting materials are typically incompatible with vacuum applications, an outgassing barrier is required. Metals can provide such barrier.

The metal that is used for sides of the housing that will be subjected to high magnetic fields is preferably poorly conducting to prevent excessive Eddy currents. Stainless steel is an example of a metal which displays this property, although the invention does not exclude the use of other metals or materials.

It is also possible within the context of the present invention to use different materials for the different sides of the housing. For instance, the sides of the housing that are parallel to the incoming magnetic field may be realized in relatively thick and light weight material, such as Aluminum, to improve the rigidity of the housing, whereas sides of the housing that are perpendicular to the incoming magnetic field are made of stainless steel to prevent excessive Eddy currents.

The first and second casting material can be any casting resin, such as polyurethane or an epoxy. Both materials or mixtures of materials may be identical. Due to the use of two separate casting steps, an interface may be identifiable between both casting materials, even if the two materials are chemically identical. The housing is preferably provided with one or more inlets through which the second casting material was injected into the housing to fill the space between the pre-casted unit and the housing and an one or more outlets through which air or gas, which was inside the space prior to the second casting step, was evacuated from the housing.

The primary part may further be provided with an electrically insulating foil in between the housing and the pre-casted unit. The insulating foil, such as a polyimide foil, may be arranged against an inside of the housing. More in particular, the insulating foil may comprise an adhesive such that the foil can be attached to the housing. After the second casting step, the pre-casted unit becomes fixedly connected to the insulating foil, which in turn is fixedly connected to the housing via the adhesive.

According to a second aspect, the present invention further relates to a linear motor that comprises the primary part as described above. In addition, the linear motor may comprise a secondary part. The secondary part comprises a plurality of permanent magnets.

According to a third aspect, the present invention further relates to a method for fabricating a primary part of a linear motor. The method of the invention comprises the steps of providing a pre-casted unit comprising at least two coils which are mutually fixed in position by a solidified first casting material, and providing a plurality of spacer elements which are coupled and/or fixedly connected to the pre-casted unit. The method further comprises the steps of providing a housing around the pre-casted unit such that the plurality of spacer elements contact the housing and ensure a space between the housing and the pre-casted unit, wherein the housing comprises an inlet and an outlet. The method also comprises the steps of casting a second casting material through the inlet to fill the space between the housing and the pre-casted unit, while simultaneously allowing air or gas, which is present in said space, to be evacuated from the housing through the outlet. The method also comprises the step of allowing the second casting material to solidify as a result of which the housing becomes fixedly connected to the pre-casted unit.

The pre-casted unit may be provided using the steps of providing the at least two coils, arranging the at least two coils in a mould, wherein the mould defines an outer shape of the pre-casted unit, and casting a first casting material into the mould and allowing the first casting material to solidify thereby forming the pre-casted unit in which the at least two coils are mutually fixed in position. Typically, a linear motor comprises coils in sets of three which are driven to have a 120 degrees phase difference with respect to each other. Electrical wiring will therefore extend from the pre-casted unit. The housing will have an opening for the wiring to be led through.

The mould may further define the plurality of spacer elements, wherein the plurality of spacer elements is formed by the first casting material during the casting of the pre-casted unit. Typically, the mould defines an outer shape of the pre-casted unit. By arranging recesses in the mould at the appropriate positions, spacer elements may be formed by the first casting material.

Alternatively, the plurality of spacer elements is arranged inside the mould prior to the casting of the first casting material, and wherein the plurality of spacer elements become fixedly connected to the pre-casted unit after solidification of the first casting material.

Alternatively, the plurality of spacer elements are attached and/or coupled to the pre-casted unit prior to arranging the pre-casted unit in the housing, and wherein the plurality of spacer elements become fixedly positioned inside the primary part after solidification of the second casting material.

The housing may be provided using the steps of using sheet parts to construct a housing around the pre-casted unit, wherein the sheet parts are placed against the spacer elements and wherein the sheet parts are connected to each other, for instance by welding. For instance, metal foil parts may be used which have a thickness ranging from 0.1 mm to 0.5 mm and a surface area of 100 cm$^2$ to 1000 cm$^2$. Foil parts with these dimensions are liable to be insufficiently rigid to construct a rigid housing. This problem is solved by using the pre-casted unit as a supporting element.

Alternatively, the housing may be provided using the steps of providing a box element and a lid element, arranging the pre-casted unit inside the box element, and connecting the lid element to the box element, for instance by welding. Also in this case, thin material and/or sheet parts may be used to construct the box element and/or lid element. Once the pre-casted unit is inserted in the box element, a rigid construction is obtained. Rigidity is important to define a flat and smooth outer surface of the primary part. In addition, if the outer sides of the primary part are not rigidly arranged during the casting of the second casting material, they may bend inwardly. This will prevent the second casting material to fully penetrate the space between the pre-casted unit and the housing. Consequently, at the location where the second casting material has not penetrated, the housing is not or not fully fixedly connected to the pre-casted unit. This may cause problems during operation. A larger air gap between the primary part and the secondary part must be used to avoid collision between the housing and the secondary part. In addition, fluctuations may occur in the acceleration or force. In addition, the linear motor may be used under vacuum or low pressure conditions. In this case, a location where the second casting material has not penetrated will effectively form an air bubble, causing catastrophic failure by pressing the housing outward.

The method may further comprise arranging an electrically insulating foil on and/or around the pre-casted unit, and/or on the inside of the housing material, prior to filling the space with the second casting material. Because the pre-casted unit has a well defined shape, it becomes possible to arrange the insulating foil at a well defined position in the housing. Furthermore, it allows the metal housing to be arranged close to the coils without risking an electrical path from the pre-casted unit to the housing.

Next, the invention will be described in more detail referring to the appended drawings, wherein.

Figure 1:
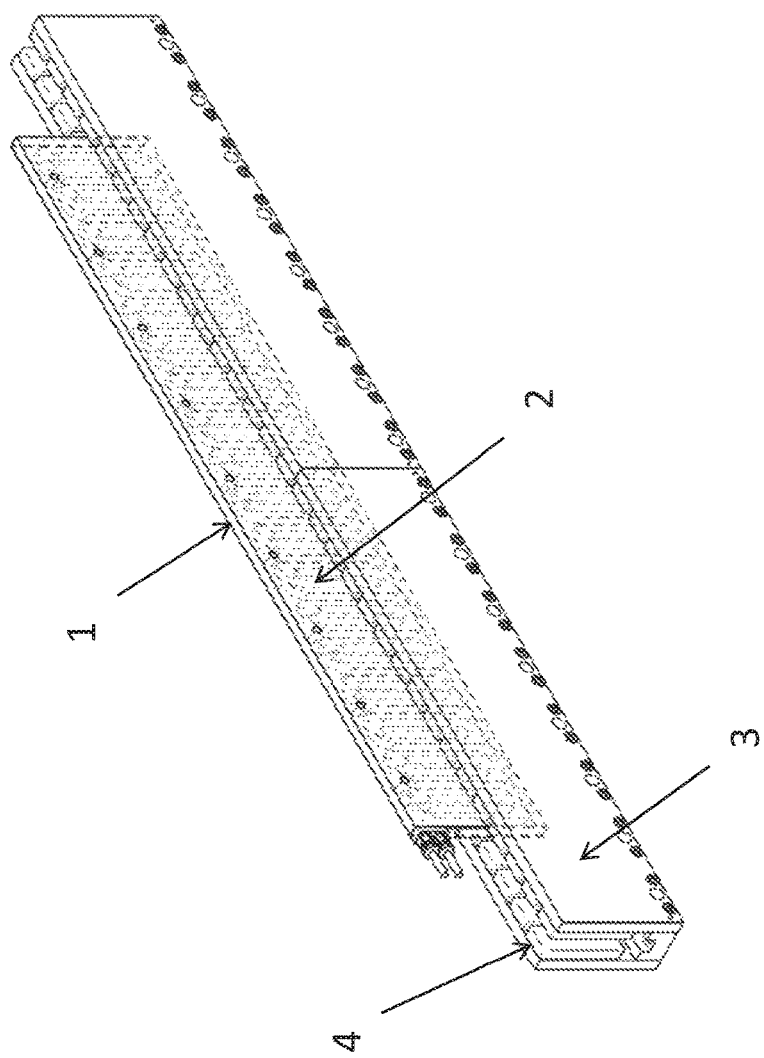
FIG. 1 illustrates a known linear motor.
Figure 2:
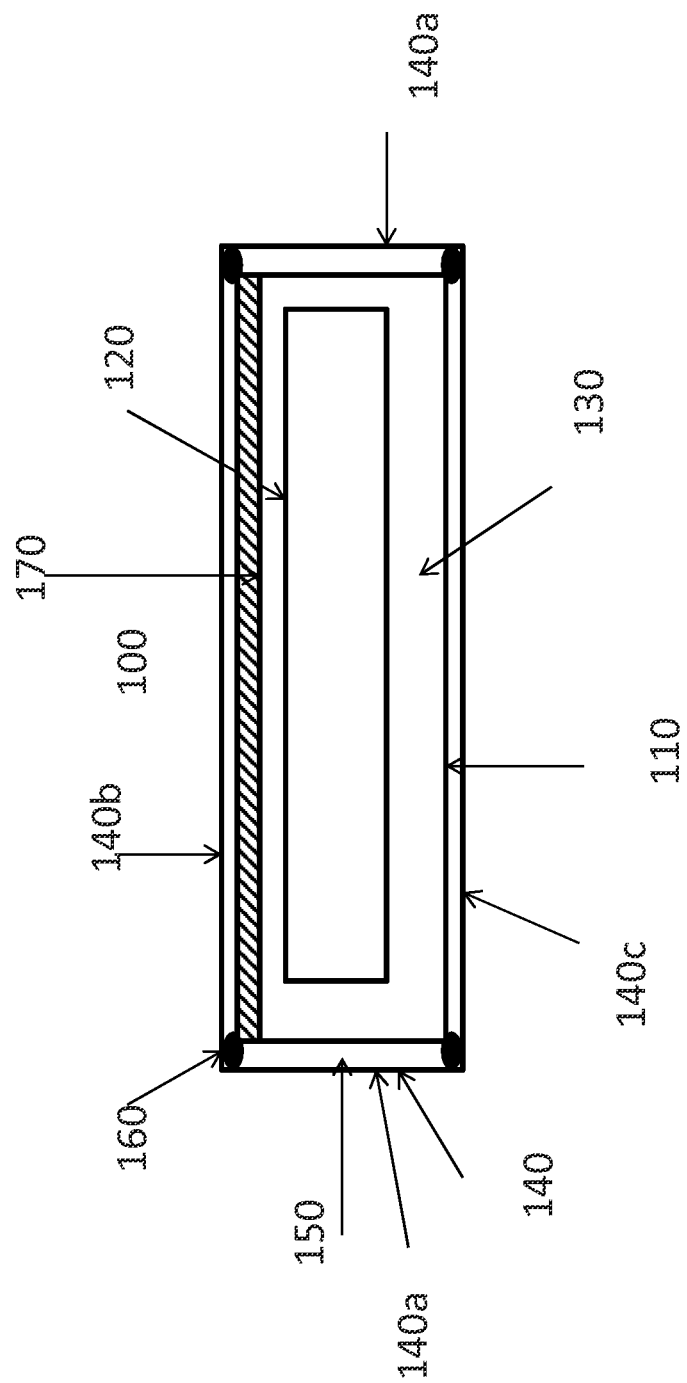
FIG. 2 illustrates a cross section of an embodiment of the primary part according to the invention.

FIG. 2 illustrates a cross section of an embodiment of the primary part according to the invention. Here, the primary part 100 comprises a pre-casted unit 110 in which a plurality of coils 120 are arranged fixedly by a solidified first casting material 130. Pre-casted unit 110 is arranged in a housing 140, wherein housing 140 is fixedly connected to pre-casted unit 110 by means of a second casting material 150. Pre-casted unit 110 contacts housing 140 via spacer elements 160 which are arranged at the corners and/or edges of pre-casted unit 110. In this embodiment, side walls 140a are made from stainless steel having a thickness of 3 mm, bottom wall 140c is made from stainless steel having a thickness of 0.2 mm, and top wall 140b is made from stainless steel having a thickness of 0.2 mm. In addition, an electrically insulating foil 170 is arranged between pre-casted unit 110 and top wall 140b. This foil 170 typically comprises polyimide.

Figure 3:
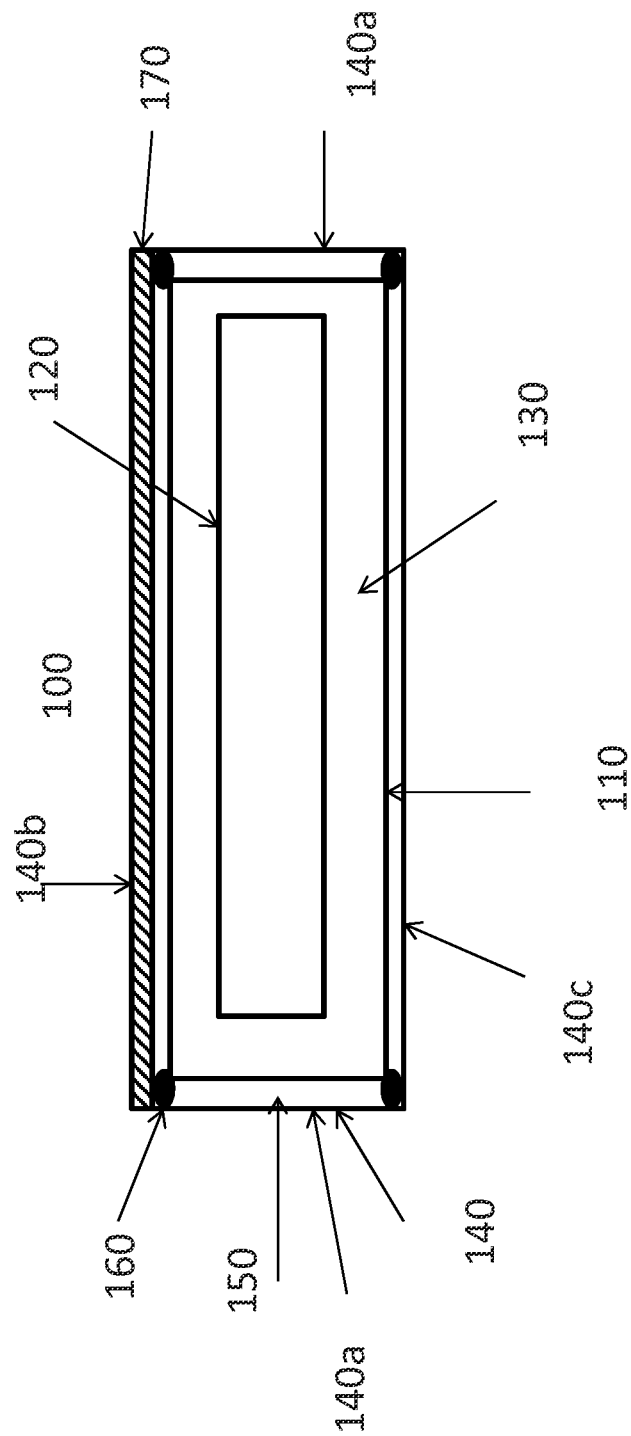
FIG. 3 illustrates a cross section of a further embodiment of the primary part according to the invention.

FIG. 3 illustrates a cross section of a further embodiment of the primary part according to the invention. Compared to FIG. 2, insulating foil 170 is connected to the inside of housing 140 instead of the outside of pre-casted unit 110. Insulating foil 170 may comprise an adhesive layer allowing it to be fixedly attached at one side to either housing 140 or pre-casted unit 110.

Figure 4:
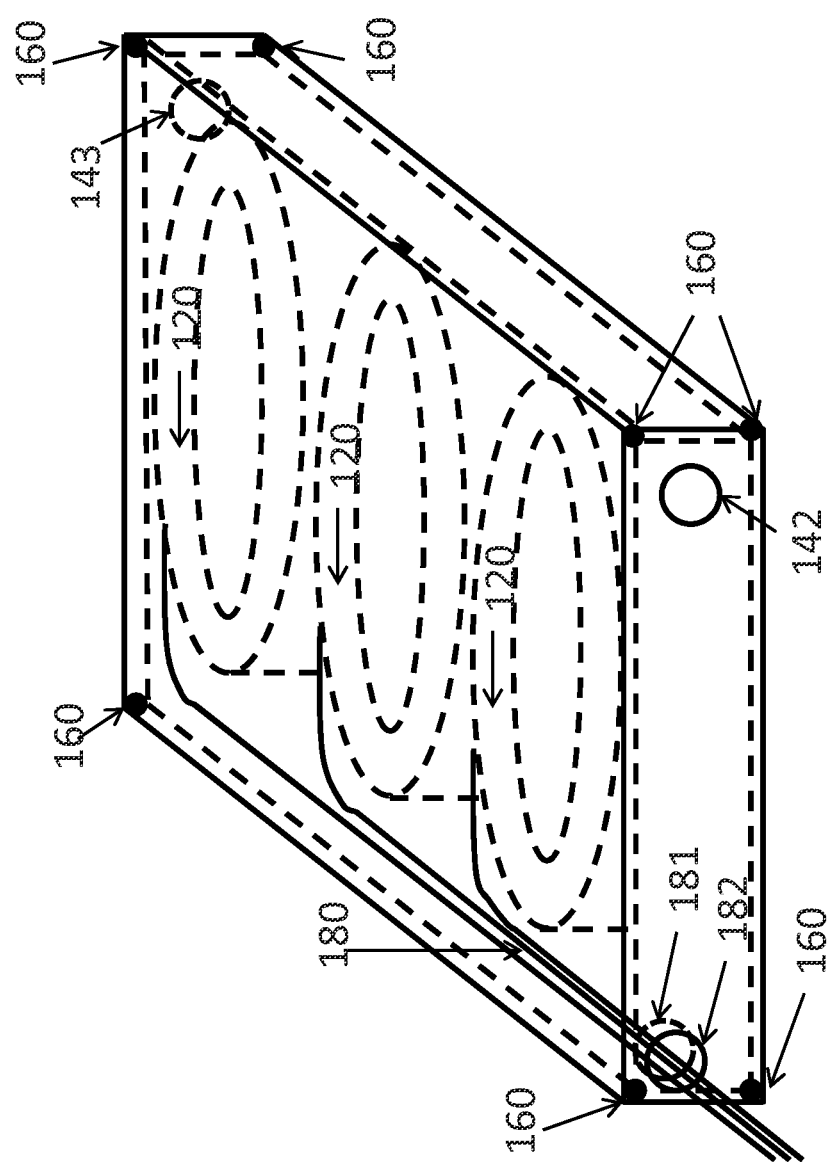
FIG. 4 illustrates a schematic overview of the embodiment in FIG. 2 or 3.

FIG. 4 illustrates an schematic overview of the embodiment in FIG. 2 or 3. Primary part 100 comprises an inlet 142 in housing 140 through which second casting material 150 has been injected. Electrical coils 120 are connected to the outside using wiring 180 that exits pre-casted unit 110 through an outlet 181 and exits housing 140 through an outlet 182. In FIG. 4, electrically insulating foil 170 is omitted. An outlet 143 is provided in housing 140 to allow gas or air in the space between pre-casted unit 110 and housing 140 to escape primary part 100 through outlet 143 during the casting of second casting material 150.

Figure 5:
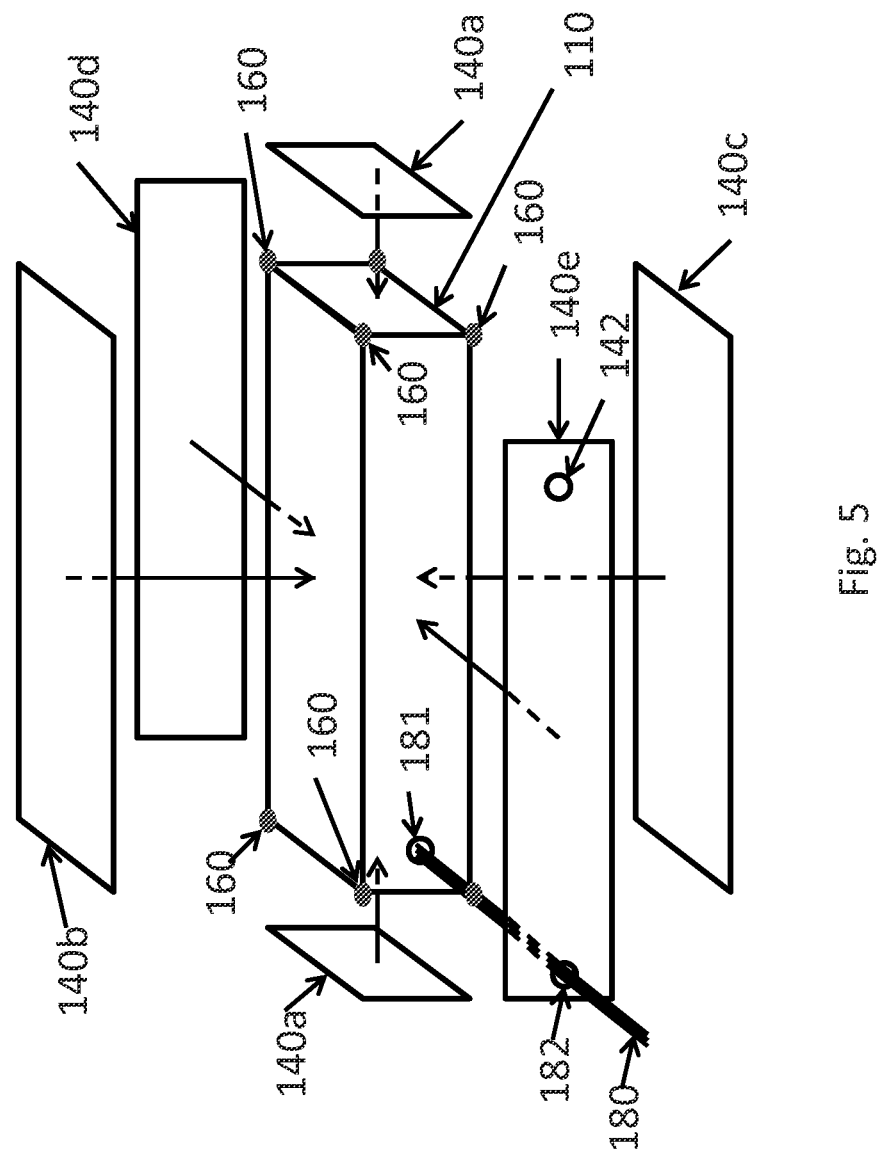
FIG. 5 illustrates a possible construction of an embodiment of the primary part according to the invention.
Figure 6:
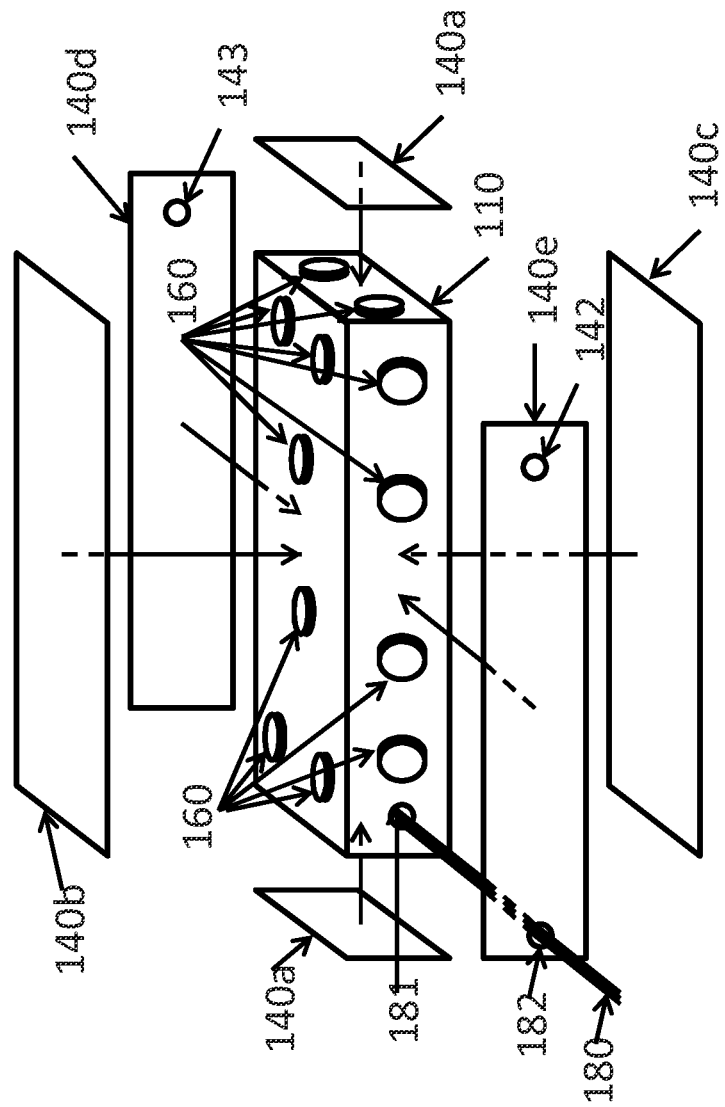
FIG. 6 illustrates the construction of the embodiment in FIG. 5, wherein different spacer elements are used.

FIGS. 5 and 6 illustrate a possible construction of an embodiment of the primary part according to the invention. Here, pre-casted unit 110 is used as a support for the construction of housing 140. Preferably, side walls parts 140a, 140d, 140e are first placed against spacer elements 160. These parts are then connected to each other by welding. Wiring 180 that extends from outlet 181 is fed through outlet 182 prior to placing side wall part 140e against spacer elements 160. After placing side walls 140a, 140d, 140e, top wall 140b and bottom wall 140c are placed and connected to the other wall parts, for instance by welding, to finalize housing 140. Once housing 140 is complete, second casting material 150 is injected through opening 142 to fixedly connect housing 140 to pre-casted unit 110. The difference between FIGS. 5 and 6 is the arrangement of spacer elements 160. In FIG. 6, spacer elements 160 are distributed over the outer surface of pre-casted unit 110.

Figure 7:
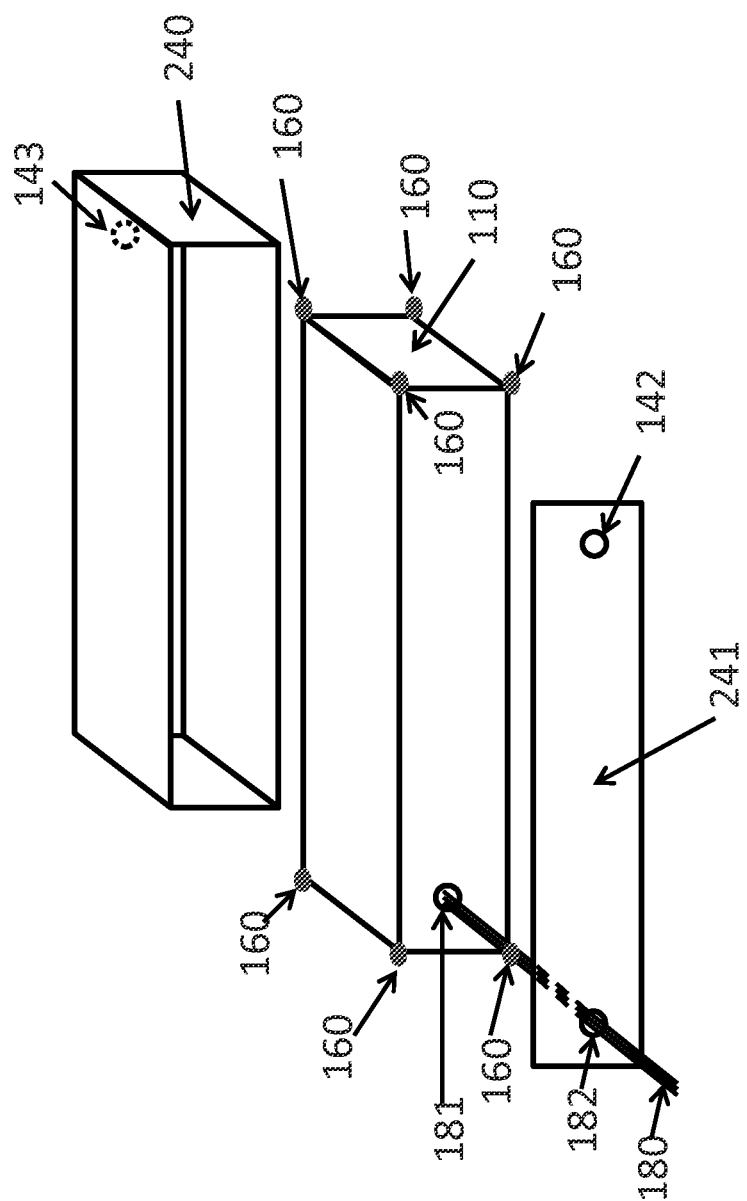
FIG. 7 illustrates a further possible construction of an embodiment of the primary part according to the invention.
Figure 8:
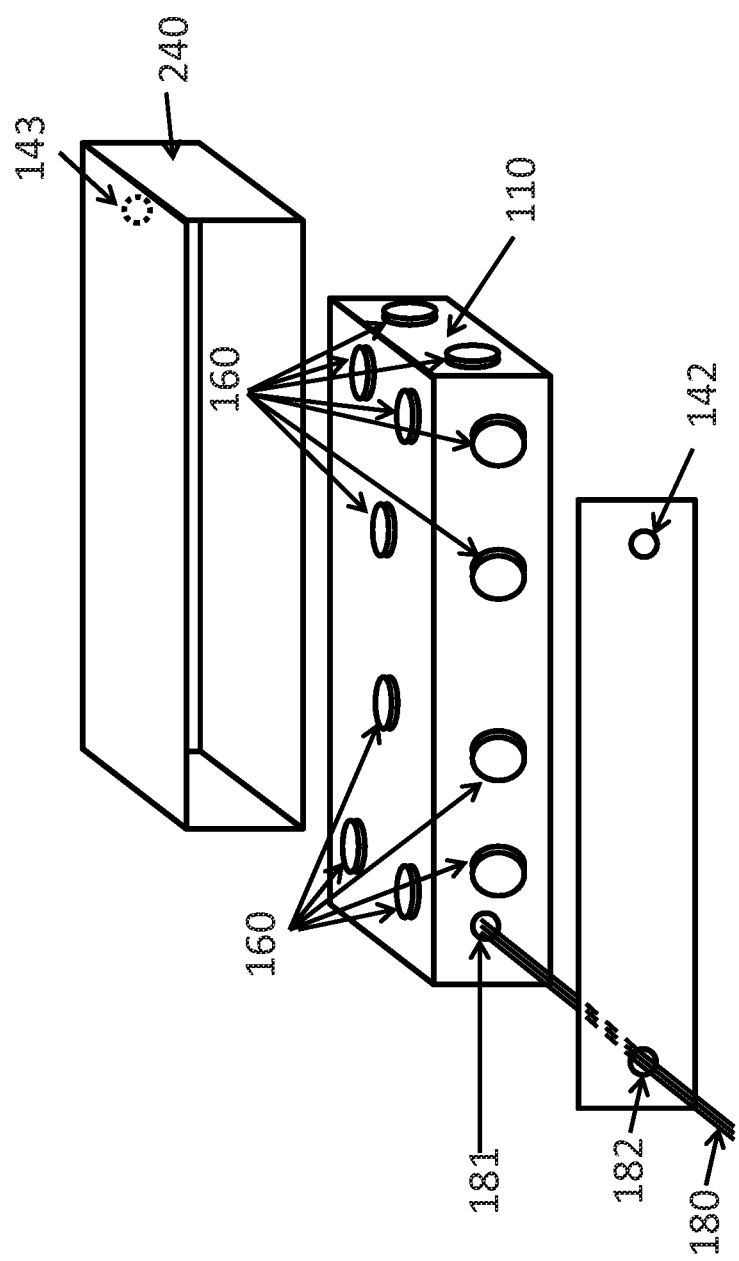
FIG. 8 illustrates the construction of the embodiment in FIG. 7, wherein different spacer elements are used.

FIGS. 7 and 8 illustrate a further possible construction of an embodiment of the primary part according to the invention. Here, the housing will be constructed using a box element 240 in which pre-casted unit 110 will be placed and a lid element 241. During and after placement, spacer elements 160 will support box element 240 and lid element 241 to improve the rigidity of the housing.

Next, lid element 241 will be fixedly connected to box element 240 to complete the housing. Similar to the housing in FIG. 5, wiring 180 is led through to the outside by means of outlets 181, 182. Also here, second casting material 150 will be injected through an opening 142 to fixedly connect the housing to pre-casted unit 110.

The difference between FIGS. 7 and 8 is the arrangement of spacer elements 160. In FIG. 8, spacer elements 160 are distributed over the outer surface of pre-casted unit 110.

It should be apparent to the skilled person that various modifications can be made in the embodiments described above without departing from the scope of the invention which is defined by the appended claims.

The invention claimed is:

1. A primary part for a linear motor, comprising:
   a housing, wherein the housing comprises a plurality of metal foil parts that are connected to each other;
   a pre-casted unit comprising at least two coils which are mutually fixed in position by a solidified first casting material;
   a plurality of spacer elements disposed between the pre-casted unit and the housing, said plurality of spacer elements contacting each side of said housing to ensure a space between each side of said housing and said pre-casted unit, wherein the plurality of spacer elements are connected to the pre-casted unit;
   a solidified second casting material filling said space between the housing and the pre-casted unit, wherein the solidified second casting material provides a fixed connection of the housing to the pre-casted unit;
   wherein the at least two coils are arranged to carry current in a plane, and wherein the housing comprises a metal foil part among said plurality of metal foil parts that has a thickness ranging from 0.1 mm to 0.5 mm and which metal foil part is arranged parallel to said plane;
   wherein the housing is provided with one or more inlets through which the second casting material is injected into the housing to fill the space between the pre-casted unit and the housing and one or more outlets through which air or gas present in the space prior to injection of the second casting material is evacuated from the housing.

2. The primary part according to claim 1, wherein the plurality of spacer elements are integrally connected to the solidified first casting material.

3. The primary part according to claim 2, wherein the plurality of spacer elements consist of the first casting material and wherein the plurality of spacer elements have been formed during the casting of the pre-casted unit.

4. The primary part according to claim 1, wherein the plurality of spacer elements comprise protruding elements which protrude outwardly from a surface, an edge and/or a corner of the pre-casted unit, wherein a length of the protruding element is within a range between 0.1 mm and 0.5 mm.

5. The primary part according to claim 4, wherein each side of the pre-casted unit is connected to at least three spacer elements.

6. The primary part according to claim 1, wherein the pre-casted unit and the housing have a bar shape.

7. The primary part according to claim 1, wherein the first and second casting material is a resin such as polyurethane or an epoxy.

8. The primary part according to claim 1, further comprising an electrically insulating foil in between the housing and the pre-casted unit.

9. The primary part according to claim 8, wherein the insulating foil is a polyimide foil, and is arranged against an inside of the housing, wherein the insulating foil comprises an adhesive to attach the foil to the housing.

10. A linear motor comprising the primary part as defined in claim 1.

11. A method for fabricating a primary part of a linear motor, comprising:
    providing a pre-casted unit comprising at least two coils which are mutually fixed in position by a solidified first casting material, and a plurality of spacer elements which are connected to the pre-casted unit;
    providing a housing around the pre-casted unit such that the plurality of spacer elements contact said housing and ensure a space between the housing and the pre-casted unit, said housing comprising an inlet and an outlet, said plurality of spacer elements contacting each side of said housing to ensure a space between each side of said housing and said pre-casted unit, said providing a housing comprising using metal foil parts to construct a housing around the pre-casted unit, wherein said metal foil parts are placed against the spacer elements and wherein said foil parts are connected to each other, wherein the pre-casted unit is used as a support through the spacer elements when the metal foil parts are placed against spacer elements;
    casting a second casting material through said inlet to fill the space between the housing and the pre-casted unit while simultaneously allowing air or gas, which is present in said space, to be evacuated from the housing through the outlet;
    allowing the second casting material to solidify as a result of which the housing becomes fixedly connected to the pre-casted unit.

12. The method according to claim 11, wherein the at least two coils are arranged to carry current in a plane, and wherein the housing comprises a metal foil part among said plurality of metal foil parts that has a thickness ranging from 0.1 mm to 0.5 mm and which metal foil part is arranged parallel to said plane.

13. The method according to claim 11, wherein said providing the pre-casted unit comprises:
    providing the at least two coils;
    arranging the at least two coils in a mould, said mould defining an outer shape of the pre-casted unit;
    casting a first casting material into the mould and allowing the first casting material to solidify thereby forming the pre-casted unit in which the at least two coils are mutually fixed in position.

14. The method according to claim 13, wherein the mould further defines the plurality of spacer elements, wherein the plurality of spacer elements is formed by the first casting material during the casting of the pre-casted unit.

15. The method according to claim 13, wherein the plurality of spacer elements are arranged inside the mould prior to the casting of the first casting material, and wherein the plurality of spacer elements become fixedly connected to the pre-casted unit after solidification of the first casting material.

16. The method according to claim 11, further comprising arranging an electrically insulating foil on and/or around the pre-casted unit and/or on the inside of the housing prior to filling the space with the second casting material.

\* \* \* \* \*